United States Patent [19]

Lancaster

[11] Patent Number: 4,718,756

[45] Date of Patent: Jan. 12, 1988

[54] MULTISEGMENTED REAR VIEW MIRROR

[76] Inventor: Benjamin H. Lancaster, 3922 Snowden, Long Beach, Calif. 90808

[21] Appl. No.: 933,128

[22] Filed: Nov. 21, 1986

[51] Int. Cl.$^4$ .............. B60R 1/08; B60R 1/04; G02B 5/08; G02B 7/18

[52] U.S. Cl. .................................. 350/616; 350/606; 350/627

[58] Field of Search ............ 350/606, 616, 626, 627, 350/632, 615, 612, 637

[56] References Cited

U.S. PATENT DOCUMENTS

| | | | |
|---|---|---|---|
| 1,426,010 | 8/1922 | Rees | 350/616 |
| 1,570,751 | 1/1926 | Langley | 350/616 |
| 1,634,748 | 7/1927 | Ischinger | 350/616 |
| 1,650,161 | 11/1927 | Streiff | 350/616 |
| 1,781,999 | 11/1928 | Bittinger | 350/616 |
| 3,063,342 | 11/1962 | Zeek | 350/637 |
| 4,575,202 | 3/1986 | McGuire | 350/627 |

FOREIGN PATENT DOCUMENTS 244778  1/1966  Austria ................. 350/606

Primary Examiner—Jon W. Henry
Attorney, Agent, or Firm—I. Michael Bak-Boychuk

[57] ABSTRACT

An adapter for mounting on the interior mirror assembly of a motor vehicle including two mirror segments hinged to each other and engaged at the free ends to the assembly. A cam adjacent the hinge can then be used to set the relative angular alignment between the segments.

4 Claims, 5 Drawing Figures

MULTISEGMENTED REAR VIEW MIRROR

BACKGROUND OF THE INVENTION

1. Field of the Invention

The present invention relates to automotive mirrors and more particularly to mirrors comprising plural, adjustable reflective surfaces.

2. Description of the Prior Art

Mirrors for use with motor vehicles have had extensive development in the past. Most typically such mirrors are fixed on universal mounts and are thus adjustable in all directions to accommodate the viewing position of the operator. In this manner mirrors may be aligned, either on the vehicle exterior or on the inside of the windshield, to provide rear viewing.

In either mounting arrangement a single plane mirror often limits the rearward field of view. Thus mirror assemblies including plural reflective planes have been devised in the past, preferably as a viewing structure mounted on the vehicle interior. Alternatively, convex mirror surfaces were formed either as convex portions, round spots or the whole reflecting surface, in order to extend the field of view.

Curved surfaces, however, always entail distortion and, consequently, field expansion is obtained at a loss of perception of distance. Accordingly, flat mirror surfaces are preferred and articulation mechanisms for adjusting mirror segments have been devised in the past as exemplified in U.S. Pat. Nos. 2,979,989, 3,151,207, and 4,019,812. While suitable for their purpose the foregoing examples each entail complex articulation mechanisms which are not fully convenient for installation by the user.

An arrangement for angular adjustment of interior mirror segments is thus extensively sought and it is one such arrangement that is disclosed herein.

SUMMARY OF THE INVENTION

Accordingly it is the general purpose and object of the present invention to provide an adaptor useful in mounting an adjustable, segmented mirror structure onto the interior mirror frame of a motor vehicle.

Other objects of the invention are to provide a hinged mirror assembly which may be fixed in opposition to the mirror frame of a motor vehicle for effecting the articulation of the hinge.

Yet further objects of the invention are to provide a convenient technique for converting a single plane mirror to an adjustable plural plane configuration.

Briefly, these and other objects are accomplished within the present invention by providing an elongate, substantially rectangular bracket of a planform just greater than the planform of an automotive mirror, the longitudinal ends of the bracket extending in the form of cantilevered spring hooks for engaging the existing mirror structure ends. The bracket .pa forms a hinge defined by overlying tabs at the ends of bracket segments each including a bore aligned for coaxial engagement by a common pivot pin. The exposed end of the pivot pin is then fixed to a knob for manual turning and thus advances in rotation a cam fixed to the pin.

A first and second mirror segment are then peripherally fixed within the bracket segments each aligning a common edge adjacent the pin. The backside of each mirror segment, moreover is adhesively fixed to a transverse ridge piece which forms a fulcrum about which adjustment is made.

In this form the assembly may be mounted onto a conventional interior mirror of a motor vehicle, with the spring hooks spread to engage the mirror ends in tension. Rotary advancement of the cam against the original mirror surface will then select the distance of the pivot pin against the spring tension of the spread hooks. The ridge pieces, in turn, fix the axial alignment of each mirror segment with that of the original mirror and selection of tapered thickness equal to the mirror taper will then provide the day-night articulation commonly available in the prior art.

In this manner a segmented assembly may be conveniently mounted onto the original mirror, expanding the lateral viewing field through the manipulation of the knob, without effect on the vertical alignment.

Alternatively, the same bracket assembly may be engaged to the original mirror housing, with the mirror removed, with the vertical angle again fixed by the pin contact with the housing edge.

DESCRIPTION OF THE PREFERRED EMBODIMENT

Figure 1:
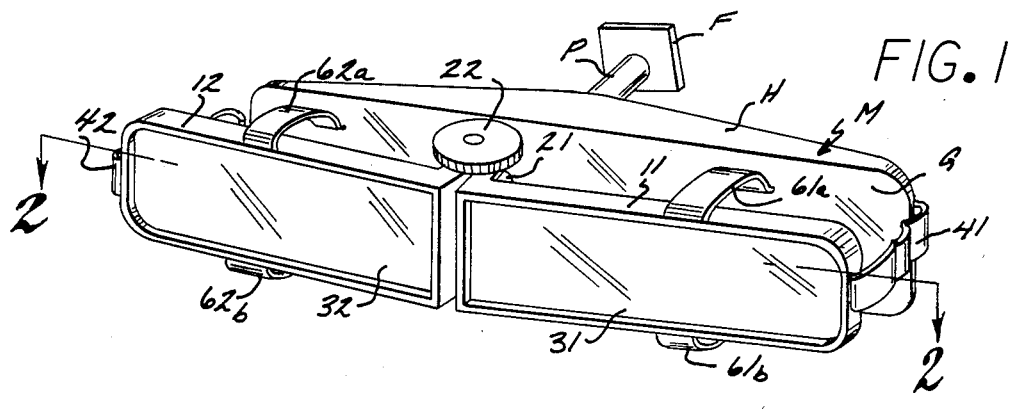
FIG. 1 is a perspective illustration, separated by parts, of the inventive mirror assembly conformed for mounting onto a prior art vehicle mirror.
Figure 2:
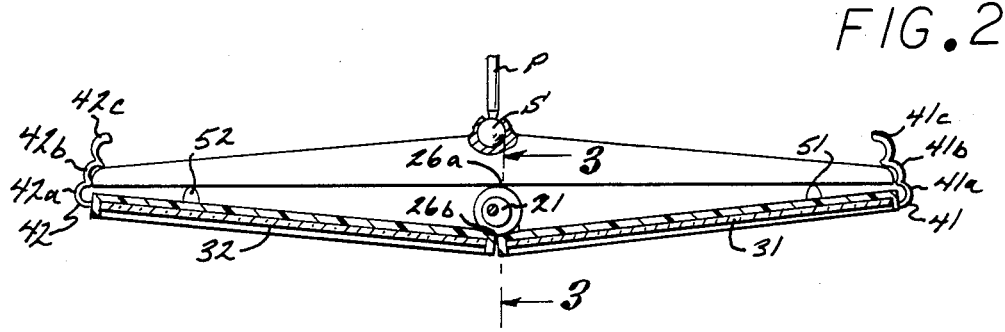
FIG. 2 is a top view, in partial section, taken along line 2—2 of FIG. 1.
Figure 3:
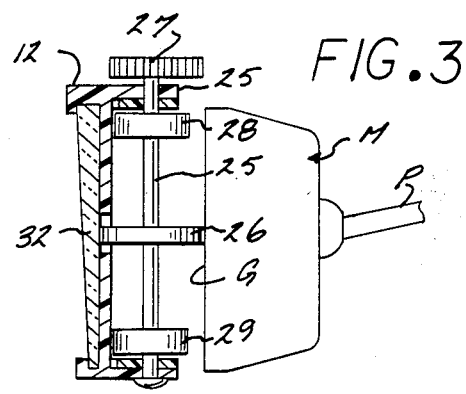
FIG. 3 is a side view, in section, taken along line 3—3 of FIG. 2.

As shown in FIGS. 1-3 a conventional rear view mirror assembly M typically includes a housing H fixed to a ball socket mount S at the end of a post P which, at the other end, engages a fixture F adhesively secured to the interior surface of a windshield W. In accordance with conventional practice housing H receives in the opening thereof a flat mirror glass G, typically of a vertically tapered section to accommodate night and day reflection selected by a control lever L.

Thus a flat glass surface G is presented in the opening of housing H which is aligned relative the viewing position of the operator (not shown). While suitable for the purposes intended, the dimensional constraints of the mirror position, the mirror surface size, and the seating placement of the operator, all combine to limit the rearward field of view. Thus blind spots result which render safe driving somewhat more difficult.

To overcome this limitation in the field of view an inventive mirror adaptor, generally designated by the numeral 10, is set out which may be directly mounted to the existing mirror assembly M. More specifically, adaptor 10 comprises a right and left frame portion 11 and 12 of a rectangular shape each provided with overlying hinge tabs 21 and 22 receiving a common pin 25 extending therethrough. Thus the frame portions 11 and 12 are hinged to each other U-shaped segments depending from a common hinge. These U-shaped portions 11 and 12 then receive corresponding mirror pieces 31 and 32 which are thus angulated by the hinge motion therebetween. To effect such angulation pin 25 may include a central cam 26, defining a cam lobe 26 (a) fairing from a circular edge 26(b). This circular edge 26(b) opposes the back surfaces of the adjacent mirror pieces 31 and 32, thus fixing the pieces in their positions in the frame. one exposed end of pin 25 is then fixed to a knob 27 which when turned will advance the lobe 26(a) in rotation.

The distal ends of frame portions 11 and 12 are provided with corresponding looped spring hooks 41 and 42 each terminating in a series of recessed convolutions 41(a), (b) and (c) and 42(a), (b) and (c) in which the lateral ends of the mirror assembly M may be selectively received. The receipt of the mirror housing ends within the above convolutions is selected for the desired spring tension drawing the mirror pieces 31 and 32 towards the original mirror surface of the assembly M. In this manner lobe 26(a) is pressed against the original mirror surface. Consequently the rotor's alignment of the cam 26, as selected by the knob 27 sets the relative angle at which the mirror pieces 31 and 32 align.

The vertical alignment of pieces 31 and 32, in turn is fixed to the vertical alignment of the mirror surface G by two vertical fulcrum ridge elements 51 and 52 adhesively fixed to the respective back sides of the mirror pieces 31 and 32 adjacent springs 41 and 42. These ridge elements may be formed of resilient material structure and will thus isolate any shock and vibration occuring in use.

Figure 5:
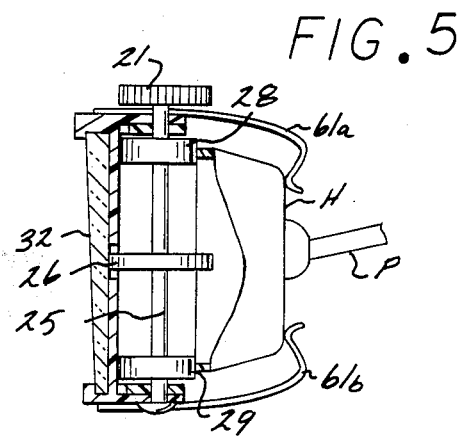
FIG. 5 is a detail view, in section, of the operative mechanism useful with the invention herein.
Figure 4:
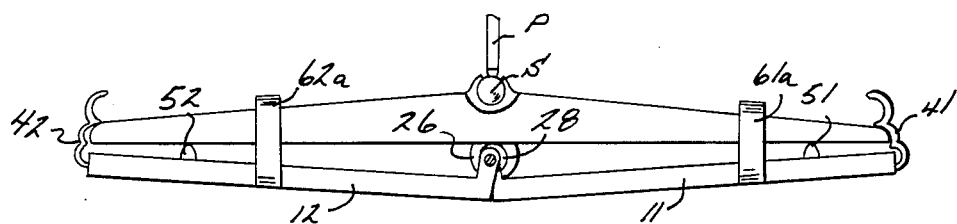
FIG. 4 is a top view of an alternative manner of mounting the inventive mirror assembly shown in FIGS. 1-3.

In the alternative as shown in FIGS. 4 and 5, the housing H may be stripped of the retained mirror surface G. For this use Pin 25 is provided within offset cam sections 28 and 29 aligned to oppose the edges of housing H. In this form each of the frame portions includes vertically spaced spring tabs 61(a) and (b) and 62(a) and (b) which surround the back side of the housing H and which then oppose the cam alignment of sections 28 and 29.

Thus variously shaped mirror assemblies can be conveniently engaged by the inventive device which then offers a hinged set of surfaces for an expanded field of view.

Of course both the mirror pieces 31 and 32 may be vertically tapered for day-night use in the manner previously practiced in the art.

Obviously many modifications and changes may be made to the foregoing without departing from the spirit of the invention. It is therefore intended that the scope of the invention be determined solely on the claims appended hereto.

What is claimed is:

1. A hinged mirror adaptor conformed for mounting on the rear view mirror assembly of an automobile, comprising:
   a frame including a first portion moveably engaged to a second portion;
   a first mirror segment received in said first portion of said frame;
   a second mirror segment received in said second portion of said frame, said first and second segments having adjacently spaced proximate edges;
   engagement means extending from said first and second portions for engaging the distal ends of said mirror assembly; and
   a cam interposed between said proximate edges of said segments and said mirror assembly for selecting the spacing therebetween.

2. Apparatus according to claim 1 wherein:
   said cam includes turning means for the rotary articulation thereof.

3. Apparatus according to claim 2 wherein:
   said engagement means includes flexible elements; and
   said mirror segments each include pivot spines opposing said mirror assembly intermediate said proximate edges and said engagement means each forming a fulcrum for the articulation of said segments by said cam.

4. Apparatus according to claim 3 wherein:
   said first and second mirror segments are of a wedge vertical cross section.

* * * * *